(12) United States Patent
Landry et al.

(10) Patent No.: US 9,398,989 B2
(45) Date of Patent: Jul. 26, 2016

(54) WHEELCHAIR GRIP RING AND METHOD FOR MAKING SAME

(71) Applicant: PRATIKO Inc., Richmond (CA)

(72) Inventors: Michel Landry, Richmond (CA); Jean-Marc Landry, Richmond (CA)

(73) Assignee: Pratiko, Inc., Richmond, Quebec (CA)

( * ) Notice: Subject to any disclaimer, the term of this patent is extended or adjusted under 35 U.S.C. 154(b) by 0 days.

(21) Appl. No.: 14/412,871

(22) PCT Filed: Jul. 5, 2013

(86) PCT No.: PCT/CA2013/050521
§ 371 (c)(1),
(2) Date: Jan. 5, 2015

(87) PCT Pub. No.: WO2014/005232
PCT Pub. Date: Jan. 9, 2014

(65) Prior Publication Data
US 2015/0190291 A1   Jul. 9, 2015

(30) Foreign Application Priority Data

Jul. 6, 2012   (CA) ...................................... 2782688

(51) Int. Cl.
*A61G 5/10*   (2006.01)
*A61G 5/02*   (2006.01)
(Continued)

(52) U.S. Cl.
CPC ............ *A61G 5/028* (2013.01); *B29C 45/1459* (2013.01); *B29C 45/14065* (2013.01); *B29C 45/14311* (2013.01); *B29C 45/14622* (2013.01); *B29C 45/14778* (2013.01); *B29C 45/14819* (2013.01); *B29C 45/34* (2013.01); *B29K 2995/0018* (2013.01); *B29K 2995/0035* (2013.01)

(58) Field of Classification Search
CPC ............ A61G 5/028; B29C 45/14065; B29C 45/14311; B29C 45/1459; B29C 45/14819
USPC ........................................................ 280/249
See application file for complete search history.

(56) References Cited

U.S. PATENT DOCUMENTS

| | | | | |
|---|---|---|---|---|
| 4,366,964 A | * | 1/1983 | Farey et al. | ................ 280/250.1 |
| 5,927,739 A | * | 7/1999 | Evling | ........................ 280/250.1 |
| 6,439,281 B1 | * | 8/2002 | Hogg | ............................ 152/152 |

(Continued)

FOREIGN PATENT DOCUMENTS

| | | |
|---|---|---|
| CN | 2275529 | 3/1998 |
| CN | 201668617 | 12/2010 |

(Continued)

*Primary Examiner* — Kevin Hurley
*Assistant Examiner* — Michael Stabley
(74) *Attorney, Agent, or Firm* — Price Heneveld LLP

(57) ABSTRACT

A wheelchair grip ring, its components, and a corresponding method for making a wheelchair grip ring are described herein. The grip ring can be mounted to, and removed from, one or more of the wheels of a wheelchair. The grip ring has a substantially rigid central ring, a polymer cover which is integral with the central ring and which covers some, or all, of the central ring. The grip ring can also have one or more mounting devices which connect either the polymer cover or the central ring to the wheel of the wheelchair. The method involves placing the central ring into a mold, and adding a polymer material into the mold. The mold can thus produce a central ring having a polymer cover which is integral with the central ring, and which covers some, or all, of the central ring.

19 Claims, 9 Drawing Sheets

(51) Int. Cl.
*B29C 45/14* (2006.01)
*B29C 45/34* (2006.01)

(56) References Cited

U.S. PATENT DOCUMENTS

| | | | |
|---|---|---|---|
| 7,040,642 B2 * | 5/2006 | Lowry | 280/304.1 |
| 7,303,203 B1 * | 12/2007 | Richter et al. | 280/250.1 |
| 2001/0007389 A1 * | 7/2001 | Frauwirth | 280/304.1 |
| 2004/0061306 A1 * | 4/2004 | Lowry | 280/304.1 |
| 2004/0103745 A1 * | 6/2004 | Willems et al. | 74/552 |
| 2013/0264791 A1 * | 10/2013 | Handel et al. | 280/250.1 |

FOREIGN PATENT DOCUMENTS

| | | |
|---|---|---|
| DE | 202005003798 | 7/2005 |
| EP | 1424054 | 6/2004 |
| GB | 2122144 | 1/1984 |
| GB | 2343662 | 5/2000 |
| GB | 2453944 | 4/2009 |
| WO | 0018346 | 4/2000 |
| WO | 2004030595 | 4/2004 |

* cited by examiner

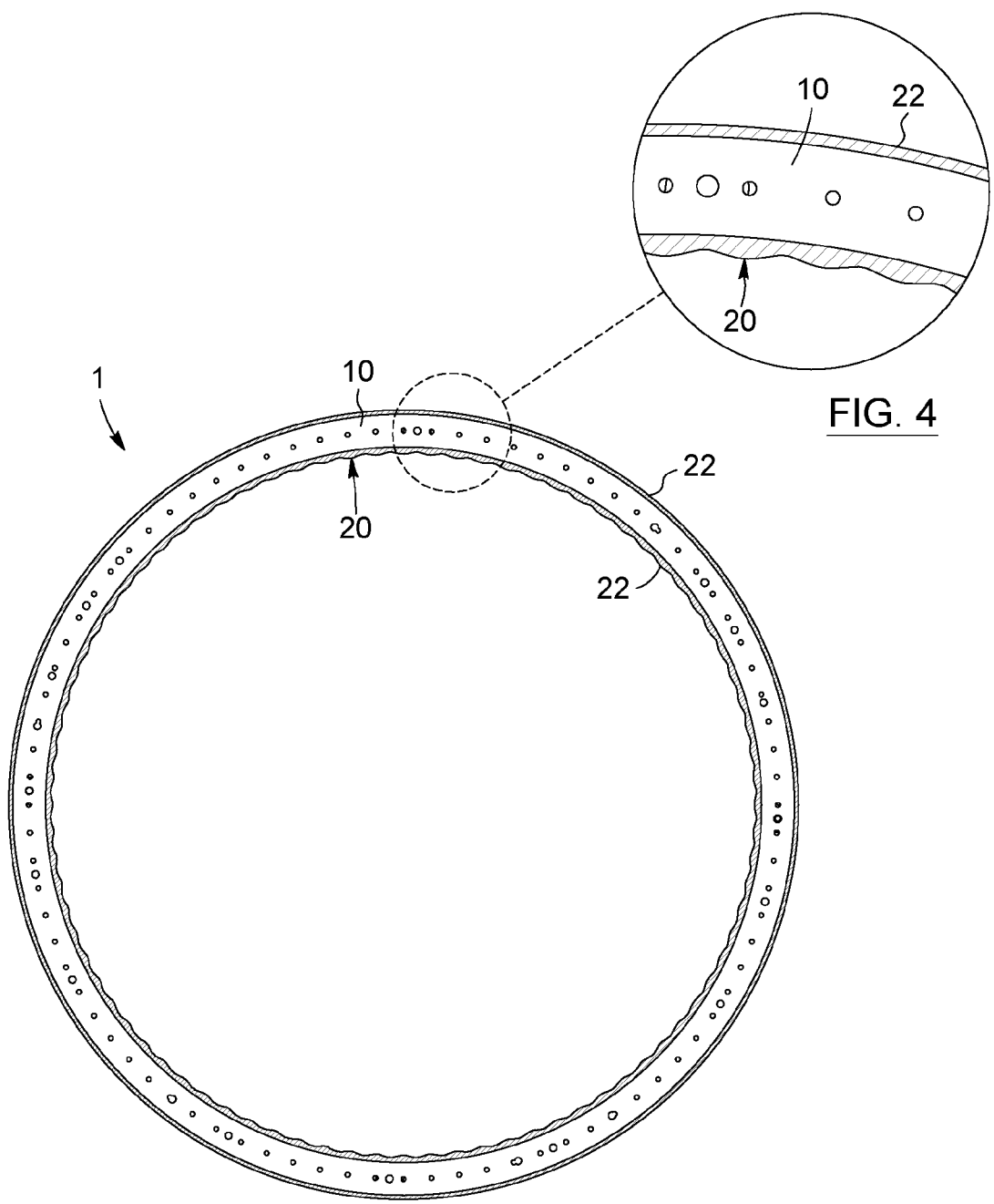

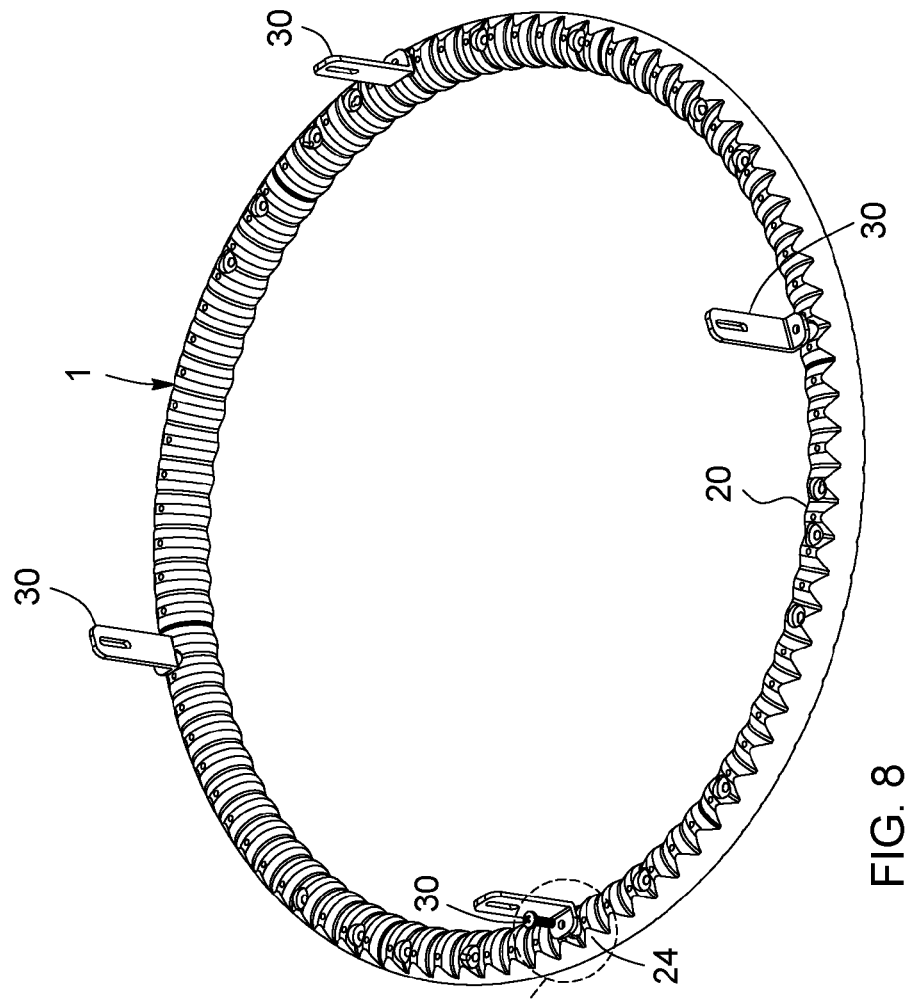
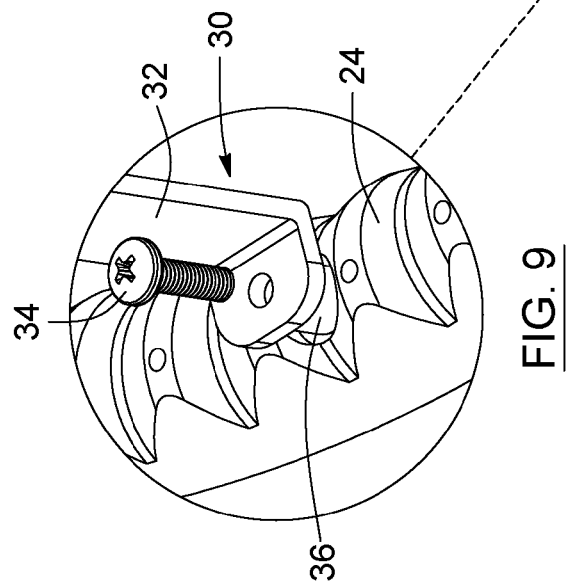
FIG. 8
FIG. 9

WHEELCHAIR GRIP RING AND METHOD FOR MAKING SAME

RELATED APPLICATION

This application claims the benefit of Canadian Patent Application No. 2,782,688 filed on Jul. 6, 2012 and entitled "ANNEAU DE PROPULSION MANUELLE EN UNE PIÈCE POUR FAUTEUIL ROULANT, MÉTHODES DE FABRICATION ET UTILISATIONS CORRESPONDANTES". This Canadian patent application is incorporated herein by reference in its entirety. This application is a national phase entry of PCT patent application serial number PCT/CA2013/050521, filed on Jul. 5, 2013, (now pending) designating the United States of America.

TECHNICAL FIELD OF THE INVENTION

The technical field relates to a grip ring for mounting to a wheel of a wheelchair, and more particularly, to a grip ring including two integrated components. It also relates to a method for making a grip ring.

BACKGROUND

Grip rings are used by people in wheelchairs. Typically, the grip ring is attached to one or both of the wheels of the wheelchair. The user of the wheelchair can grip the grip ring so as to accelerate and put the wheelchair in motion. The user can also grip the grip ring to decelerate or brake, thereby stopping the motion of the wheelchair.

The nature and types of grip rings can vary depending on the wheelchair being used and its intended application. For example, a grip ring for a wheelchair used in the sport of wheelchair rugby may not be the same as the grip ring of a wheelchair intended for everyday use.

International patent application WO 2004/030595 A2 relates to a two-piece and one-piece cover for a grip ring. The two-piece cover includes a soft, resilient inner pad and an outer sleeve enclosing the inner pad. The one-piece cover includes a soft, resilient inner pad and an outer layer permanently attached to the inner pad. Both the one-piece and two-piece covers can be removed from or installed on the grip ring.

UK patent application GB 2 453 944 A relates to an auxiliary ring structure for a hand-propelled wheelchair. The structure includes a ring made of plastic material. A number of grip sections protrude inwardly from the ring, are spaced from each other, and have outer diameters larger than that of the ring. Each grip section may be wrapped and secured with a pad, held in place by means of fixtures and corresponding holes, for the user to grasp in a comfortable way.

Other documents in this field which are known the Applicant include: CN 201668617 U; CN 2275529; DE 20 2005 003 798 U1; EP 1 424 054 A1; GB 2 122 144 A; GB 2 343 662 A; and WO 00/18346.

BRIEF SUMMARY OF THE INVENTION

It is therefore an aim of the present invention to address the above-mentioned issues.

According to a general aspect, there is provided a wheelchair grip ring comprising: a substantially rigid central ring; and a polymer cover covering at least a portion of the central ring and being integral therewith.

In an embodiment, the grip ring has at least one mounting device secured to at least one of the central ring and the cover, and which is engageable with wheel of the wheelchair.

In an embodiment, the cover has an external surface having opposed lateral portions and a central portion extending between the lateral portions. The lateral portions and the central portion can be integral with one another so as to cover the entire central ring.

In an embodiment, the cover has a colour determined as a function of grip ring usage codes, and the cover may be phosphorescent.

In an embodiment, the lateral portions are textured and the central portions are substantially smooth.

In an embodiment, the at least one mounting device is mountable to the lateral portion of the cover facing the wheel, and is further mountable to a rim of the wheel. The at least one mounting device can also consist of a bracket inclined at some angle to the horizontal, the bracket being mountable to the central ring by traversing the external surface of the cover In an embodiment, the grip ring has a plurality of mounting points for removably receiving the at least one mounting device.

According to another general aspect, there is provided a method for making a wheelchair grip ring, the method comprising: providing a mold having an inner surface for making the grip ring; placing a substantially rigid central ring in the mold; and adding a polymer material to the mold containing the central ring so as to form a polymer cover covering at least a portion of the central ring and being integral therewith, thereby making the grip ring.

In an embodiment, the mold comprises an upper portion and a lower portion defining a molding cavity, and further comprises at least one air vent for evacuating air from within the molding cavity. The mold can also have a plurality of air vents, at least one of the air vents extending from the molding cavity through the upper portion.

In an embodiment, placing the central ring in the mold comprises spacing the central ring from the inner surface of the mold with at least one mounting device.

In an embodiment, the mold and the central ring contained therein is inclined at a molding angle. The molding angle can have a value between about 10° and about 45° with the horizontal.

In an embodiment, the polymer material is cured within the mold.

According to still another general aspect, there is provided a wheel for a wheelchair comprising: a central hub; a rim section concentrically mounted about the central hub; and a grip ring securable to the rim section. The grip ring comprises: a substantially rigid central ring; and a polymer cover covering at least a portion of the central ring and being integral therewith.

According to a further general aspect, there is provided a wheelchair comprising: two wheels disposed on left and right sides of the wheelchair, each wheel comprising a central hub and a rim section concentrically mounted about the central hub; and a grip ring securable to the rim section of at least one of the wheels. The grip ring comprises: a substantially rigid central ring; and a polymer cover covering at least a portion of the central ring and being integral therewith. The wheelchair further comprises at least one mounting device securing the grip ring to the rim section.

According to a further general aspect, there is provided a wheelchair phosphorescent grip ring comprising: a substantially rigid central ring; and a phosphorescent polymer cover covering at least a portion of the central ring and being integral therewith.

According to a further general aspect, there is provided a method for making a phosphorescent wheelchair grip ring, the method comprising: providing a mold having an inner surface for making the phosphorescent grip ring; placing a substantially rigid central ring in the mold; mixing a phosphorescent powder with a polymer material so as to make a phosphorescent polymer mixture; and injecting the phosphorescent polymer mixture to the mold containing the central ring so as to form a polymer cover covering at least a portion of the central ring, thereby making the phosphorescent grip ring.

BRIEF DESCRIPTION OF THE DRAWINGS

FIG. 3 is a front cross-sectional view of the grip ring shown in FIG. 2, taken along the line III-Ill;

FIG. 4 is a close-up view of a circled part of the grip ring shown in FIG. 3;

FIG. 8 is a perspective view of a grip ring equipped with multiple mounting devices in accordance with an embodiment;

FIG. 9 is a close-up view of a circled part of the grip ring shown in FIG. 8;

It will be noted that throughout the appended drawings, like features are identified by like reference numerals.

DETAILED DESCRIPTION

Figure 1:
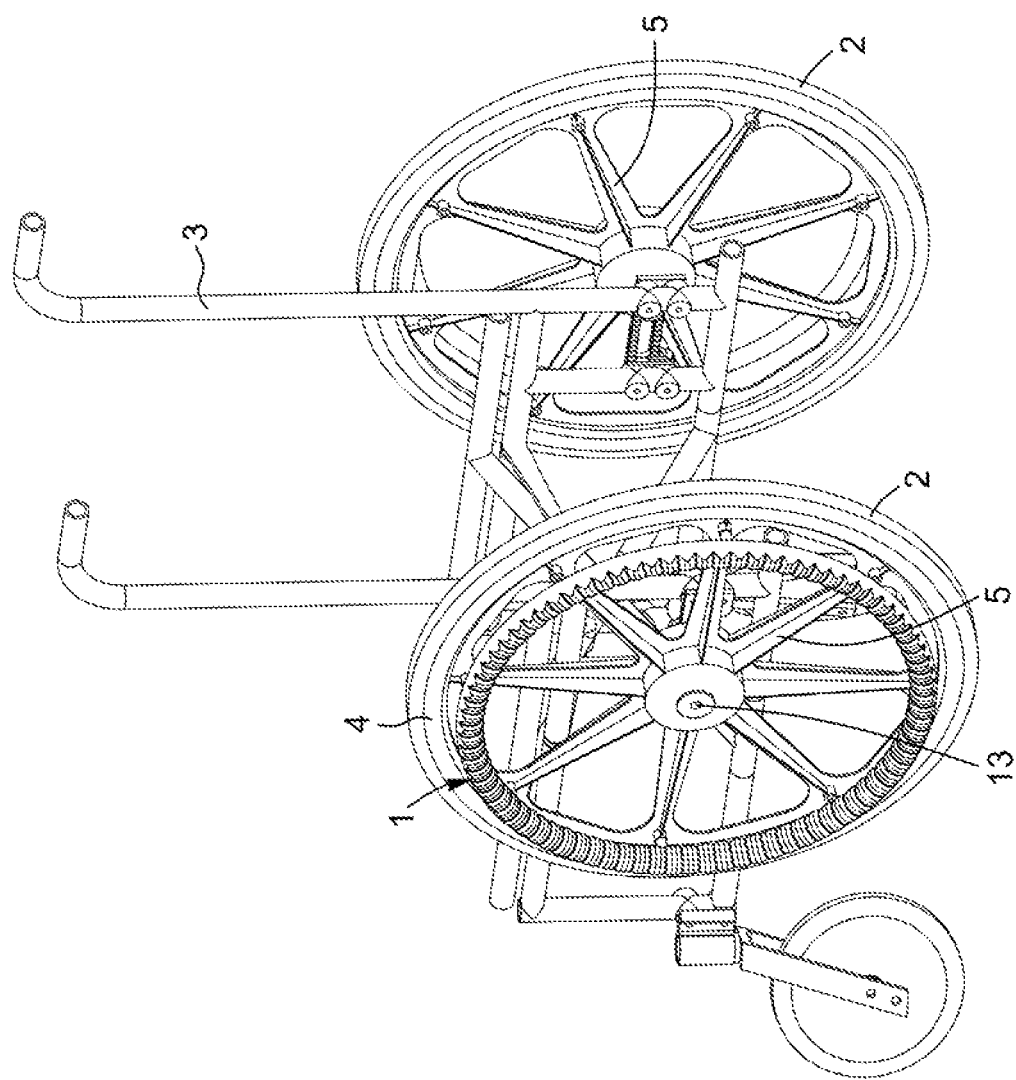
FIG. 1 is a perspective view of a wheelchair having a wheel fitted with a grip ring in accordance with an embodiment.

Referring now to the drawings and, more particularly, referring now to FIG. 1, there is shown a grip ring 1 mounted to a wheel 2 of a wheelchair 3. The grip ring 1 provides a graspable object conveniently located close to the wheel 2 of the wheelchair 3 which can be manipulated by a user of the wheelchair 3. This manipulation allows for a force to be applied to the wheels 2 of the wheelchair 3 so as to propel the user forward, and so as to stop the movement of the wheelchair 3. More particularly, the rotation of the grip ring 1 by the user can engage the wheel 2 in rotation, and thus move or stop the wheelchair 3. In some embodiments, two grip rings 1 can be used, each grip ring 1 being mounted to, and removable from, a corresponding wheel 2 of the wheelchair 3.

The wheelchair 3 is not limited to the particular configuration shown in FIG. 1. Different types of wheelchairs 3 can be used with the grip ring 1 described herein. Similarly, the wheels 2 shown in FIG. 1 can have a different configuration than the one shown, and still be used with the grip ring 1 described herein. In some embodiments, the wheel 2 may have a central hub 13, and a rim section 4 which extends concentrically (i.e. shares the same central axis) around the central hub 13. The central hub 13 and the rim section 4 can be connected together by any suitable device, such as spokes 5 which extend between the central hub 13 and the rim section 4. Alternatively, the central hub 13 and the rim section 4 can be connected together by a disc or arms.

Figure 2:
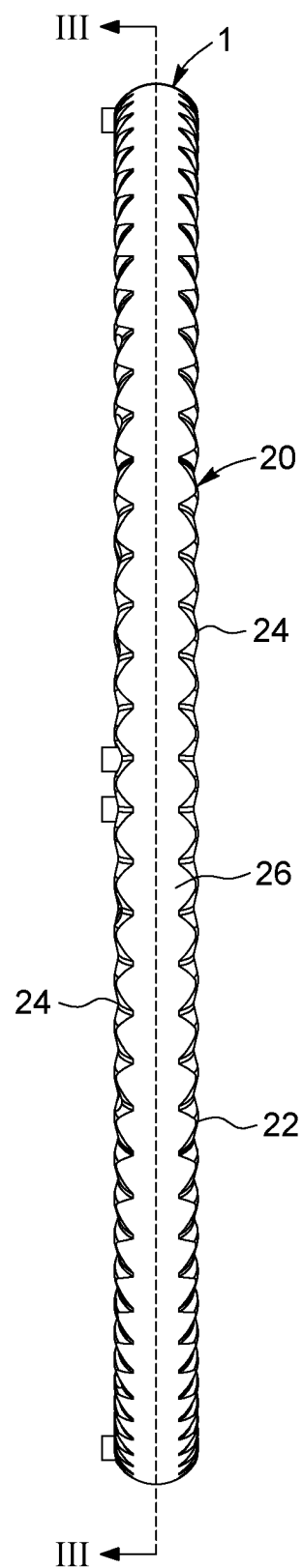
FIG. 2 is a front view of a grip ring in accordance with an embodiment.

The grip ring 1 includes a substantially rigid central ring 10, an example of which is shown in FIGS. 2 to 4. The central ring 10 provides structure to the grip ring 1, and enables the grip ring 1 to resist the forces applied thereto by a user of the wheelchair as he holds and squeezes the grip ring 1 as needed to accelerate or decelerate the wheel of the wheelchair. The term "substantially" as used to describe the rigidity of the central ring 10 refers to the considerable degree of inflexibility of the central ring 10. The term "substantially" does not limit the central ring 10 to a given value or range of values of material hardness. In some embodiments, the central ring 10 can be made of substantially hard materials such as ferrous metals, non-ferrous metals, ferrous alloys, non-ferrous alloys, aluminum, and composite materials. The substantial rigidity of the central ring 10 can be maintained irrespective of whether the central ring 10 is hollow, full-bodied/solid, or any combination in between.

The grip ring 1 further includes a polymer cover 20, an example of which is also shown in FIGS. 2 to 4. The polymer cover 20 covers some, or all, of the central ring 10, thus providing a surface which can be gripped by the user so as to accelerate and decelerate the wheel of the wheelchair. The term "covers" refers to the presence of the cover 20 over some percentage of the central ring 10 such that the hand of the user contacts the cover 20 instead of the central ring 10 when gripping the grip ring 1. The hardness of the polymer cover 20 can vary. In some embodiments, the cover 20 has a hardness value between about 10A and about 95A. In some embodiments, the cover 20 has a hardness value between about 40D and about 95D. It can thus be appreciated that the hardness of the cover 20 is adaptable to meet the needs of the user according to the level of grip and the level of comfort required, among other possible factors.

The term "polymer" refers to the material composition of the cover 20, which can be made of any naturally occurring or synthetic compounds that have large molecules made up of many subunits or monomers. Some examples of such compounds include natural polymers, synthetic polymers, reticulated polymers, and non-reticulated polymers. Additional examples of suitable polymeric materials include polyurethane, vinyl, natural rubbers, butyl rubbers, and polyurethane characterized according to ASTM standard no. D 2240 or ISO 7619.

The cover 20 is integral with the central ring 10. The term "integral" when used to describe the relationship between the cover 20 and the central ring 10 refers to each of the cover 20 and central ring 10 forming an essential part of one another, or being difficultly disassociated from one another. It may therefore be considered that the cover 20 and the central ring 10 form a single unit, which can thus characterize the grip ring 1 as "one-piece" or "single-piece". Such integrality can be achieved in different ways. In some embodiments, one of the central ring 10 or the cover 20, or both, are coated with an adhesive coating so as to integrally bond both components together. In some embodiments, a process is employed to make the cover 20 integral with the central ring 10. This process can involve adhesion, thermal bonding, mechanical linkage, and/or micro infiltration. In some embodiments, the cover 20 is molded to the central ring 10. It can thus be appreciated that the resulting integral grip ring 1 can include a cover 20 which covers the entire central ring 10 and which is not detachable from the central ring 10 because no joints or other discontinuities are present in the grip ring 1. This allows for the formation of a permanent concentric grip ring 1 which is free of discontinuities and which can be removed from, or attached to, the wheel of a wheelchair.

Still referring to FIGS. 2 to 4, the cover 20 may have an external surface 22 forming the interface between the hand of the user and the grip ring 1. In some embodiments, the external surface 22 of the cover 20 may be adapted so as to introduce a distinctive marking or colouring scheme. Such a feature may advantageously distinguish one particular type of grip ring 1 from another. In some embodiments, the cover 20 or its external surface 22, or some part thereof, can have a colour which is selected as a function of usage codes for grip rings 1. For example, some colours, such as lime green, may designate a grip ring 1 for a new user who is to be trained by a health professional. Similarly, a green cover 20 can be associated with the action of advancing. The colour can also be selected depending on the preferences of the user, while other colours may designate a grip ring 1 to be used for certain activities. These colours can be applied in any suitable fashion to the cover 20 or its external surface 22, such as by forming a line, marking dots interspersed along the external surface 20, or painting the entire external surface 20, to name but a few examples. Similarly, the colour can be phosphorescent, or can emit light or other detectable radiation. Such an illuminated cover 20 can allow for an increased visibility of the grip ring 1, and thus the wheelchair, which can have various safety advantages.

Figure 7:
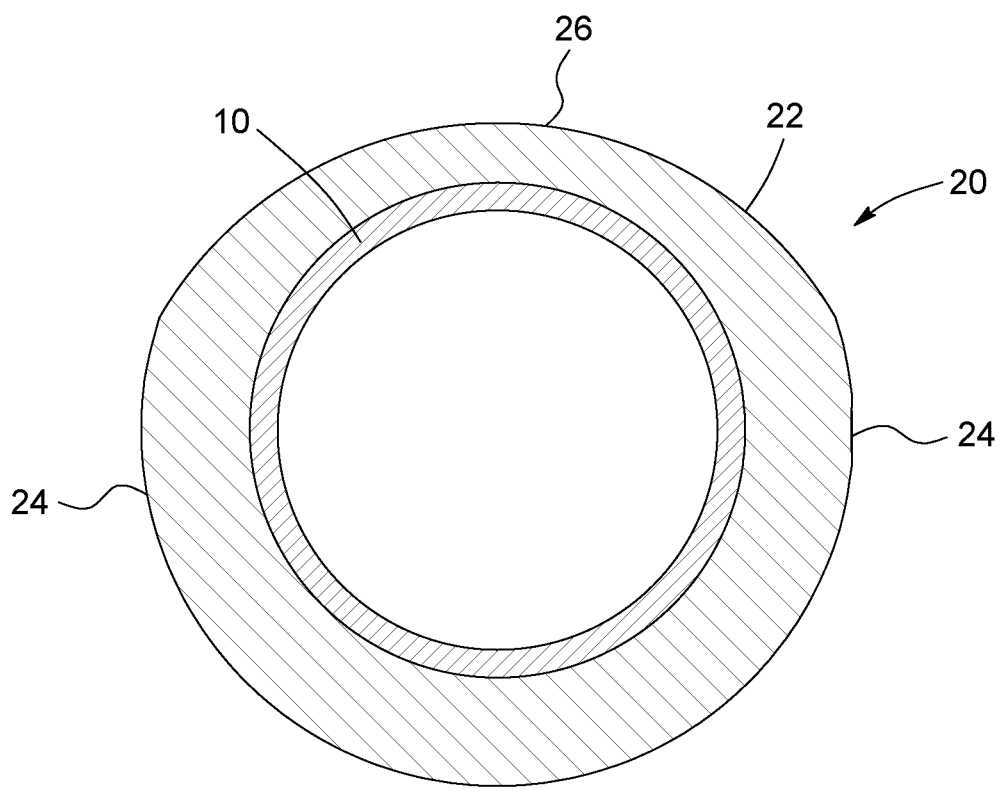
FIG. 7 is a side elevational cross-sectional view of a grip ring in accordance with an embodiment.

The external surface 22 itself may have opposed lateral portions 24 and a central portion 26 which extends between the lateral portions 24, an example of which is provided in FIG. 7. The lateral portions 24 correspond to the sides of the cover 20. The central portion 26 corresponds to the "strip" or portion of the cover 20 which is positioned between the sides of the cover 20. Together, the lateral portions 24 and the central portion 26 form an integral structure (i.e. no joints or discontinuities) which allow for the external surface 22 of the cover 20 to be present over some, or all, of the central ring 10. The portions 24,26 together may advantageously allow the user to better control the motion and movements of the wheelchair, as will become apparent from the additional description provided below.

Figure 5:
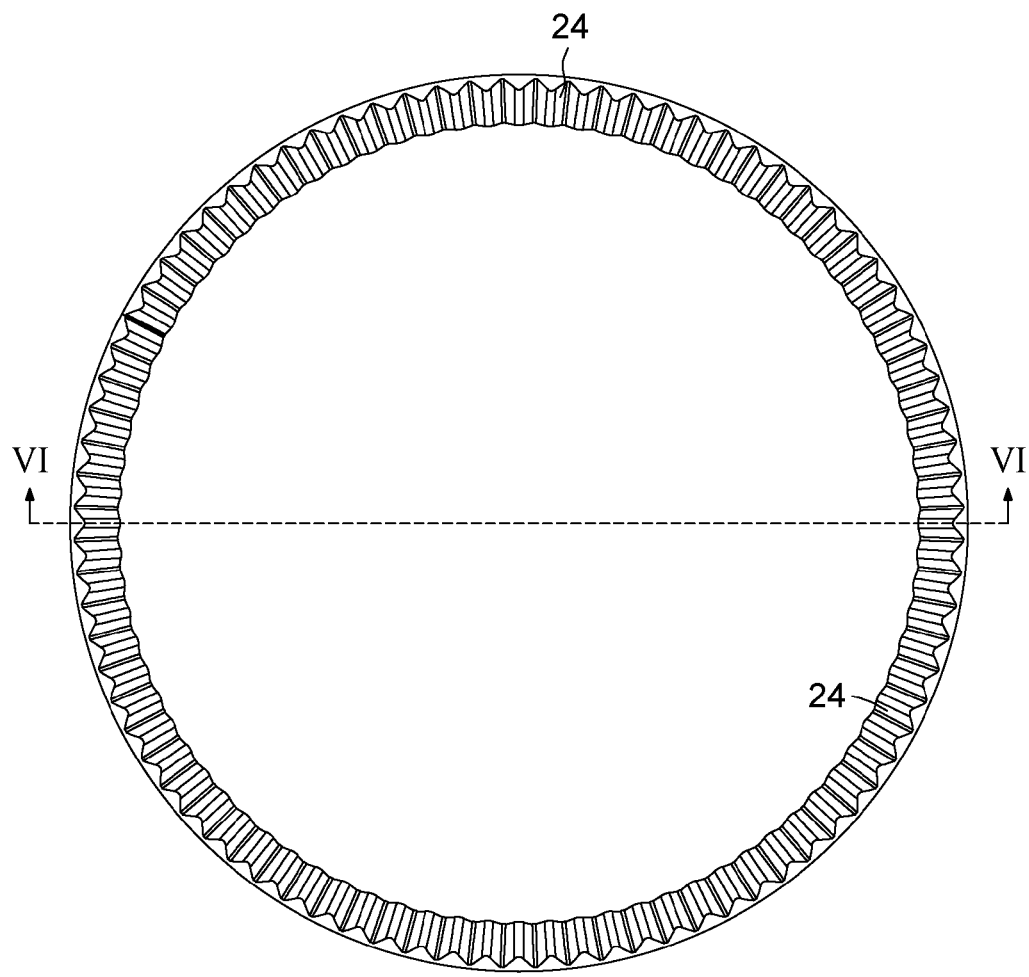
FIG. 5 is a side elevational view of a grip ring in accordance with an embodiment.
Figure 6:
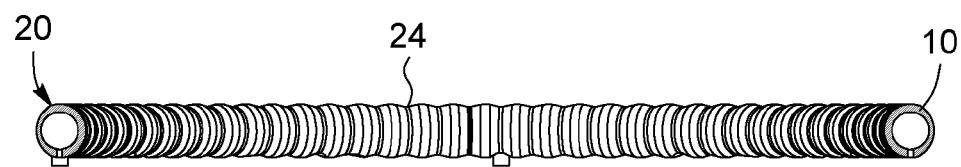
FIG. 6 is a top cross-sectional view of the grip ring shown in FIG. 5, taken along the line VI-VI.

The lateral portions 24 and the central portion 26 can have different surface profiles so as to impart different performance characteristics to the wheel in response to the user's input. In some embodiments, the lateral portions 24 are textured with a given configuration, pattern, or design. FIGS. 5 and 6 provide an example of such textured lateral portions 24, which are shown as having a serrated or notched pattern, although other textured configurations are possible. The textured lateral portions 24 shown in FIGS. 5 and 6 also extend along toward the center of the grip ring 1 (i.e. along the inner portion of the grip ring 1), thereby permitting the user's fingers to comfortably grip the textured lateral portions 24. The user may thus be able to better manipulate the grip ring 1 and increase the efficiency by which he can accelerate or change direction. Returning to FIG. 2, the central portion 26 can be substantially smooth. This smooth profile can advantageously allow the user to better decelerate the motion of the grip ring 1, and thus of the wheel, by facilitating the manner by which the user applies friction to the external surface 22 so as to slow the rotation of the grip ring 1. Further advantageously, the smooth profile, particularly if it has a relatively soft hardness of about 30 Shore A, can also allow the user to better accelerate the motion of the grip ring 1, and thus of the wheel. Such a smooth profile may feel "sticky" to the user, thus allowing him to simply place his palm or hand against the smooth profile so that the hand "sticks" thereto and provides traction. The feeling of stickiness is a result of an increased friction coefficient of such a smooth profile, and can be particularly advantageous for a person who has difficulty in prehension, or is otherwise unable to fully grasp the grip ring 1.

In some embodiments, the lateral portions 24, whether textured or not, cover at least about 60% of the area of the external surface 22 of the cover 20. In some embodiments, this percent area is located on the sides and inner portion of the grip ring 1. Further optionally, the central portion 26, whether substantially smooth or not, can be present over a maximum of about 50% of the area of the external surface 22 of the cover. Similarly, this percent area can be located along a strip running along the middle of the lateral portions 24.

The grip ring 1 also includes at least one mounting device 30, an example of which is shown in FIGS. 8 to 12. The at least one mounting device 30 can include one or more mounting devices 30, and reference to "a" mounting device 30 herein includes "multiple" mounting devices 30, and vice versa. The mounting devices 30 can be mounted to, and removed from, either the central ring or the cover 20, and can also be mounted to the wheel of the wheelchair. The mounting device 30 therefore connects the grip ring 1 to the wheel, thereby allowing the forces generated by the user and applied to the grip ring 1 to be transferred to the wheel of the wheelchair. In most embodiments, but not necessarily all, one end of the mounting devices 30 is mounted to the lateral portion 24 of the cover 20 which is intended to face toward the wheel when mounted to the wheel. The other end of the mounting device 30 is mounted to the rim or rim section of the wheel.

The nature and configuration of the mounting device 30 can vary depending on numerous factors including, but not limited to: the forces expected to be applied the user, the size of the wheel, the size of the grip ring, and the materials used to make the mounting device. Some examples of mounting devices 30 will now be described with reference to the figures.

Figure 10:
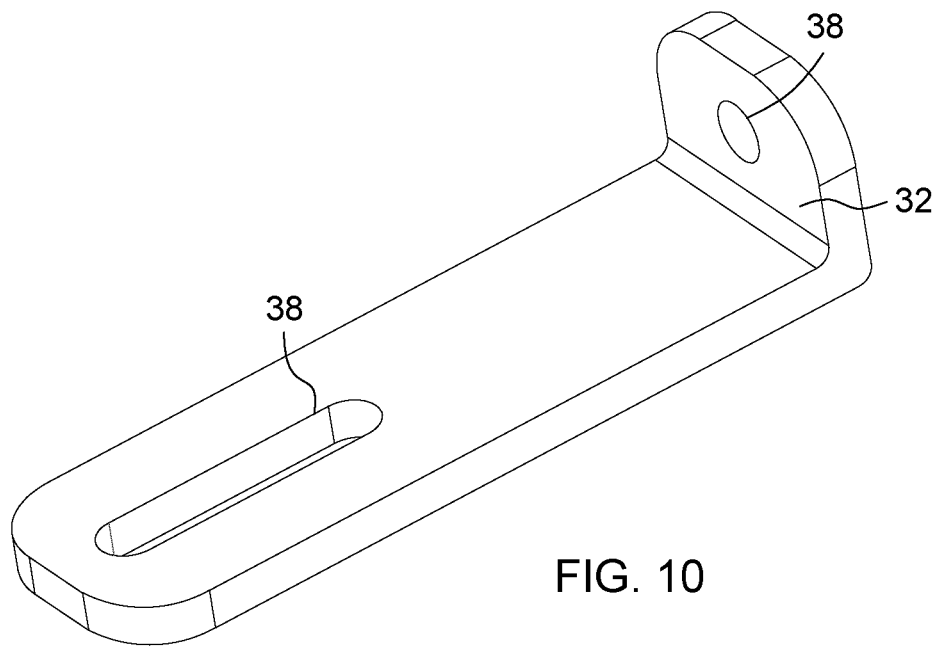
FIG. 10 is a perspective view of a mounting device in accordance with an embodiment.
Figure 11:
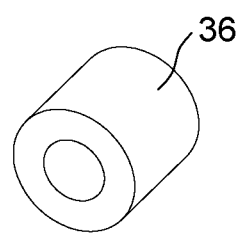
FIG. 11 is a perspective view of a spacer of a mounting device in accordance with an embodiment.

FIGS. 9 to 11 provide an example of a suitable mounting device 30. The mounting device 30 can consist of a bracket 32 disposed at some inclination with respect to the horizontal when it is mounted to the grip ring. In some embodiments, but not necessarily all, the bracket 32 is disposed in a substantially horizontal configuration. The bracket 32 can include mounting slots 38 on both the end mountable to the grip ring, and on the end mountable to the wheel. The mounting slots 38 can be used to adjust the position of the bracket 32 so that it can be properly mounted to both the grip ring and to the wheel.

The bracket 32 can be mounted directly to the central ring of the grip ring by being inserted through an aperture in one of the lateral portions 24 of the cover. Such a bracket 32 can be an L-bracket, where one arm of the "L" is mounted to the central ring and the other arm of the "L" is mounted to the wheel or its rim section. In some embodiments, the mounting device 30 can include, in addition to the bracket 32, a mechanical fastener such as a screw 34. The screw 34 can be applied to a threaded hole within the central ring and through one of the mounting slots 38 so as to allow the mounting device 30 to be mounted directly to the central ring. The mounting device 30 can also include a spacer 36. The spacer 36 can be placed inside the aperture of the lateral portion 24 and can be adapted to receive the screw 34.

Figure 12:
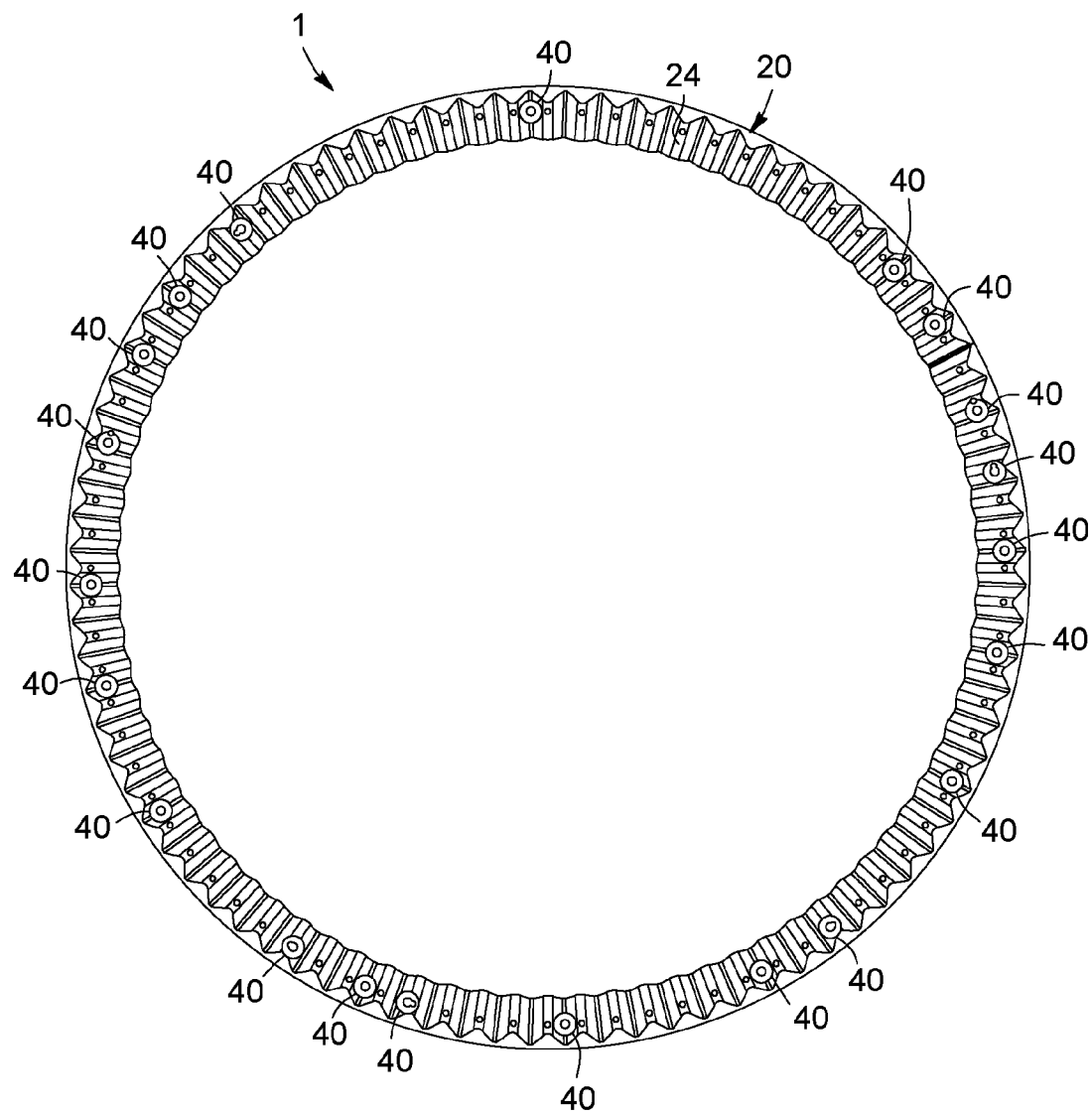
FIG. 12 is a side elevational view of a grip ring having multiple mounting points in accordance with an embodiment.

The mounting devices 30 are mounted to a plurality of mounting points 40, examples of which are provided in FIG. 12. The mounting points 40 provide the locations on the grip ring 1 at which the mounting devices 30 are to be mounted and removed. In some embodiments, each mounting point 40 consists of an aperture which extends through one of the lateral portions 24 of the cover 20, and connects as well to the central ring. Some length of the aperture extending through the lateral portion 24 or the central ring can be threaded, so as to better receive a screw, for example.

The location of the mounting points 40 along the grip ring 1 can vary depending on numerous factors including, but not limited to: difficulty in manufacturing, the expected force to be transferred from the grip ring 1 to the wheel, and the nature of the wheelchair being used. In some embodiments, the mounting points 40 are disposed along the grip ring 1 at angular intervals corresponding to 360°/n, where n is the number of mounting points 40. The number of mounting points 40, n, can vary between 2 and 9. For example, where n equals 4, the number of mounting points 40 will be four and they will be separated from one another by an angular interval of 90°. Similarly, where n equals 6, the number of mounting points 40 will be six and they will be separated from one another by an angular interval of 60°. In some embodiments, the number of mounting points 40 exceeds the number of mounting devices. In other words, not all mounting points 40 must receive a corresponding mounting device.

In accordance with another general aspect, there is provided a method for making a grip ring, such as the one described above, for mounting to the wheel of a wheelchair.

Figure 13:
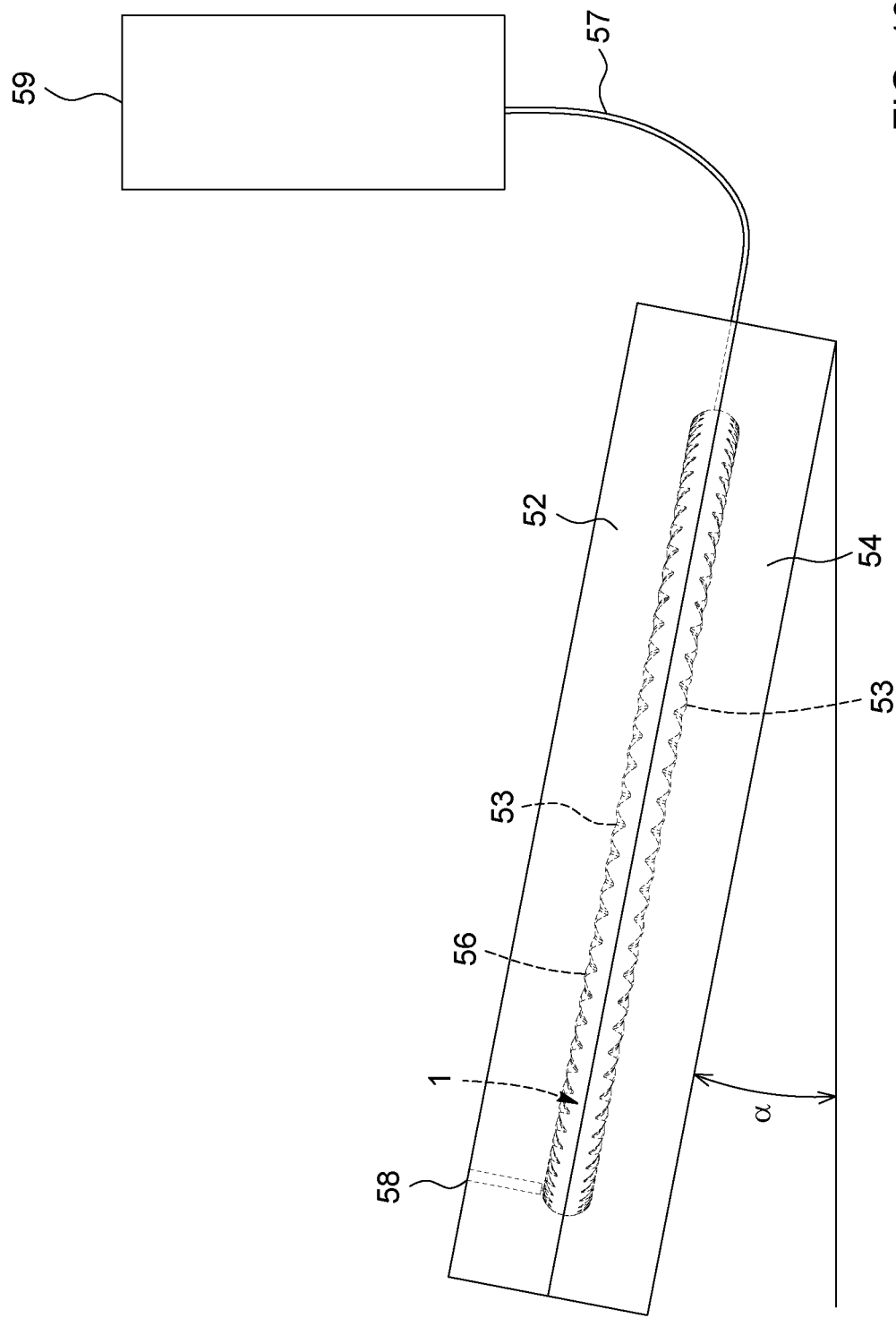
FIG. 13 is a side elevational view of a mold for making a grip ring in accordance with an embodiment.

The method includes the step of providing a mold which has an inner surface for making the grip ring. The mold can be used to make an integral or "one-piece" grip ring from two separate components, as further explained below. FIG. 13 provides an example of such a mold 50. In some embodiments, the mold 50 has an upper portion 52 and a lower portion 54. Each of these upper and lower portions 52,54 have an inner surface 53 with a depression defined therein against which the central ring can be placed so that the polymer material can be molded around it. When the upper and lower portions 52,54 are closed against each other, they define a molding cavity 56 into which the central ring can be placed. In some embodiments, the molding cavity 56 can consist of an annular cavity.

The mold 50 can also include at least one air vent 58 from which air can be evacuated from the molding cavity 56. In some embodiments, the mold 50 has more than one air vent 58. At least one of these air vents 58 can extend through the upper portion 52 from the moulding cavity. Each of the air vents 58 can be cylindrical, and can each have vent diameters. Those air vents 58 which have the largest vent diameters can extend through the upper portion 52, so as to encourage more air to evacuate the moulding cavity 56 vertically upward. To further encourage such an upwardly-directed evacuation of air, the air vents 58 which have the smallest vent diameters can extend through the lower portion 54 of the mold 50. These lower air vents 58 can also help to ensure that any air trapped in the lower portion 54 can escape the mold 50.

The mold 50 can also include a tubing 57 connecting the mold 50 to a source of polymer material 59. The source of polymer material 59 can provide polymer material through the tubing 57 and to the mold 50 by gravity flow or under pressure.

The method also includes the step of placing a substantially rigid central ring, such as the one describe above, into the mold 50. The central ring constitutes the object which can be placed in the molding cavity 56 and so that the polymer material can be molded around it, thereby forming the polymer cover integral with the central ring described above.

Prior to the central ring being placed in the mold 50, the inner surfaces 53 of the mold 50 can be coated with a release agent so as to ensure that the molded grip ring 1 can be relatively easily removed from the mold 50. In some embodiments, the central ring can be placed in the mold 50 so that it is spaced a certain distance from the inner surface 53 of the mold. This will allow for a proper thickness and uniformity in the polymer cover which is to be molded around the central ring. Such a spacing of the central ring can be accomplished with the mounting devices described above, which can further advantageously allow for the mounting devices to form an integral part of the central ring and/or grip ring 1. In some embodiments, the central ring can be coated with an adhesive prior to the polymer cover being molded around it. As explained above, this may help ensure that the central ring and the polymer cover are molded to form an integral unit.

In some embodiments, the method can also include the step of inclining the mold 50 and the central ring at a molding angle $\alpha$. The inclination of the mold 50 containing the central ring and/or the polymer cover may allow for better drainage of excess molding material from the surface of the central ring. The inclination of the mold 50 may also assist in forcing air within the molding cavity 56 to be evacuated through the air vents 58. The molding angle $\alpha$ can be considered to be the angle formed between the mold 50 and the horizontal plane upon which it rests. The molding angle $\alpha$ can be any suitable value. In some embodiments, the molding angle $\alpha$ has a value between about 10° and about 45° with the horizontal.

The method also includes the step of adding a polymer material, such as any of those described above, to the mold 50 containing the central ring. The addition of the polymer material around the surface of the central ring forms a polymer cover which covers some, or all, of the central ring and is integral therewith. The addition of the polymer material can be done through gravity, or under pressure. In some embodiments, the polymer material is added into the lower portion 54 of the mold 50. In some embodiments, the polymer material is added by being injected into the molding cavity 56. Further optionally, the polymer material can be pre-heated before being added to the mold 50.

In some embodiments, the addition of the polymer material can include mixing a phosphorescent material, such as a phosphorescent powder, with the polymer material, such as polyurethane. Further optionally, the phosphorescent powder can be added to a translucent polyurethane. Examples of possible phosphorescent powders include those derived from rare earth materials which, in some embodiments, can provide phosphorescence for a significant period of time (ex: 20 hours). Such a mixture of polymer and phosphorescent materials allows for the making of a grip ring which has a phosphorescent cover which is integral with the central ring.

In some embodiments, the method may also include the step of curing the polymer material within the mold 50 so as to make the grip ring 1. The time at which the polymer material cures, or the curing temperature, can be varied as required. It can thus be appreciated how a central ring can be made integral with a polymer cover, thereby forming a "one-piece" grip ring 1.

There is also provided a method for making a phosphorescent wheelchair grip ring, such as the one described above, for mounting to the wheel of a wheelchair. As with the previous method described above, this method involves providing a mold having an inner surface for making the phosphorescent grip ring, placing a substantially rigid central ring in the mold, and providing a polymer material so as to form a polymer cover covering at least a portion of the central ring and being integral therewith.

The method also includes the step of mixing the phosphorescent powder with the polymer material, thereby making phosphorescent polymer mixture which will form the cover of the grip ring. In some embodiments, the polymer material is a translucent polyurethane, which can consist of two parts: a first part being a prepolymer and a second part being a polyol or hardener. In some instances, simply adding phosphorescent powders to polyurethane will trap unwanted air in the phosphorescent polymer mixture. In order to reduce the occurrence of this trapping of air, the phosphorescent powder can be integrated within the second part (i.e. the polyol or hardener) of the polyurethane. This integration can be accomplished by mixing these two components together relatively vigorously. Depending on the desired intensity of phosphorescence or "glow", an amount of about 2% to about 40%, by weight, of phosphorescent powder can be mixed with the second part. This integrated mixture can then be left to settle and thus evacuate any air bubbles, or it can be actively degassed. Once the air is sufficiently removed from the mixture, this integrated second part can be mixed with the first part so as to obtain the phosphorescent polymer cover.

In light of the preceding, it can thus be appreciated that the grip ring 1 described herein, as well as the method for making the same, can provide at least some of the following advantages: greater protection of the user's hands while operating the grip ring 1; ease of use, greater resistance to abrasions and tearing; easier to clean and/or disinfect; greater security; greater enjoyability; greater manoeuverability; greater braking ability; increased visual profile which can help to improve security; greater visibility at night time or in reduced-lighting spaces due to the presence of a phosphorescent cover; reduction in costs; reduction in damages caused to walls or furniture; reduction in thermal conductivity which can be particularly advantageous for user's having circulation problems and when used in climates have extreme temperatures (i.e. Québec winters and Australian summers).

Although the embodiments of the grip ring 1 and corresponding parts thereof consist of certain geometrical configurations as explained and illustrated herein, not all of these components and geometries are essential to the invention and thus should not be taken in their restrictive sense. It is to be understood, as also apparent to a person skilled in the art, that other suitable components and cooperation therein between, as well as other suitable geometrical configurations, may be used for the wrapping apparatus according to the present invention, as it will be briefly explained herein and as can be easily inferred here from by a person skilled in the art. Moreover, it will be appreciated that positional descriptions such as "above", "below", "left", "right" and the like should, unless otherwise indicated, be taken in the context of the figures and should not be considered limiting.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A wheelchair grip ring comprising:
   a substantially rigid central ring; and
   a polymer cover covering at least a portion of the central ring, the central ring and the polymer cover forming a single piece, wherein the polymer cover comprises an external surface having opposed lateral ions and a central portion extending between the lateral portions, the lateral portions and the central portion being integral with each other with the lateral portions being textured and the central portion being substantially smooth.

2. The grip ring as claimed in claim 1, wherein the cover substantially covers the entire central ring and is concentric with the central ring.

3. The grip ring as claimed in claim 1, wherein the cover is molded to the central ring.

4. The grip ring as claimed in claim 1, wherein the cover permanently covers the central ring and being free of annular discontinuities.

5. The grip ring as claimed in claim 1, wherein at least one of the central ring and the cover comprise an adhesive coating at the interface with the other of the central ring and the cover to increase the bond therebetween.

6. The grip ring as claimed in claim 1, wherein the at least one mounting device is secured to the lateral portion of the cover facing the wheel, and is further mountable to the wheel.

7. The grip ring as claimed in claim 1, wherein the cover is made from a material selected from the group consisting of: natural polymers, synthetic polymers, reticulated polymers, and non-reticulated polymers.

8. The grip ring as claimed in claim 1, wherein the cover is made from phosphorescent polyurethane.

9. The grip ring as claimed in claim 1, wherein the cover has a hardness value between about 10A and about 95A.

10. A wheel for a wheelchair comprising:
    a central hub;
    a rim section concentrically mounted about the central hub; and
    a grip ring as claimed in claim 1 and securable to the rim section.

11. The wheel as claimed in claim 10, wherein the cover substantially covers the entire central ring and is concentric with the central ring.

12. The wheel as claimed in claim 10, wherein the cover permanently covers the central ring.

13. The wheel as claimed in claim 10, wherein the cover is free of annular discontinuities.

14. A wheelchair comprising:
    two wheels disposed on left and right sides of the wheelchair, each wheel comprising a central hub and a rim section concentrically mounted about the central hub;
    the grip ring as claimed in claim 1 securable to the rim section of at least one of the wheels; and
    at least one mounting device securing the grip ring to the rim section.

15. A method for making a wheelchair grip ring, the method comprising:
    providing a mold having an inner surface for making the wheelchair grip ring;
    placing a substantially rigid central ring in the mold including spacing the central ring from the inner surface of the mold with at least one mounting device; and
    adding a polymer material to the mold containing the central ring so as to form a polymer cover covering at least a portion of the central ring and forming a single piece therewith, thereby making the wheelchair grip ring.

16. The method as claimed in claim 15, further comprising inclining the mold and the central ring at a molding angle ranging between about 10° and about 45° with the horizontal.

17. The method as claimed in claim 15, further comprising curing the polymer material within the mold.

18. The method as claimed in claim 15, wherein placing the central ring in the mold further comprises applying an adhesive coating to the central ring.

19. A method for making a wheelchair grip ring, the method comprising:
   providing a mold having an inner surface for making the wheelchair grip ring;
   placing a substantially rigid central ring in the mold; and
   adding a polymer material to the mold containing the central ring so as to form a polymer cover covering at least a portion of the central ring and forming a single piece therewith, thereby making the wheelchair grip ring wherein adding the polymer material further comprises adding a phosphorescent powder to the polymer material and the polymer material is translucent polyurethane.

* * * * *